(12) United States Patent
Slade et al.

(10) Patent No.: US 12,006,430 B2
(45) Date of Patent: Jun. 11, 2024

(54) FIRE-RETARDANT RESINS AND COMPOSITE MATERIALS

(71) Applicant: Gurit (UK) Ltd., Newport (GB)

(72) Inventors: Laura-Jane Slade, Ryde (GB); Paul John Spencer, Southampton (GB); Amy Alexandra Ferris, Cowes (GB)

(73) Assignee: Gurit (UK) Ltd., Hampshire (GB)

(*) Notice: Subject to any disclaimer, the term of this patent is extended or adjusted under 35 U.S.C. 154(b) by 625 days.

(21) Appl. No.: 17/261,892

(22) PCT Filed: Aug. 2, 2019

(86) PCT No.: PCT/EP2019/070923
§ 371 (c)(1),
(2) Date: Jan. 21, 2021

(87) PCT Pub. No.: WO2020/025806
PCT Pub. Date: Feb. 6, 2020

(65) Prior Publication Data
US 2021/0284834 A1    Sep. 16, 2021

(30) Foreign Application Priority Data
Aug. 3, 2018 (GB) ...................... 1812680

(51) Int. Cl.
| | |
|---|---|
| C08J 5/24 | (2006.01) |
| B32B 27/38 | (2006.01) |
| C08G 59/24 | (2006.01) |
| C08G 59/36 | (2006.01) |
| C08G 59/38 | (2006.01) |
| C08K 3/34 | (2006.01) |
| C08K 3/36 | (2006.01) |
| C08K 3/38 | (2006.01) |
| C08K 3/40 | (2006.01) |
| C08K 5/19 | (2006.01) |
| C08K 5/21 | (2006.01) |
| C08K 5/315 | (2006.01) |
| C08K 5/3445 | (2006.01) |
| C08K 5/3492 | (2006.01) |
| C08K 5/5313 | (2006.01) |
| C08K 5/5357 | (2006.01) |
| C08L 63/00 | (2006.01) |
| C08L 63/02 | (2006.01) |
| C08L 63/04 | (2006.01) |
| C09J 7/35 | (2018.01) |

(52) U.S. Cl.
CPC ............ *C08L 63/04* (2013.01); *C08G 59/245* (2013.01); *C08G 59/36* (2013.01); *C08G 59/38* (2013.01); *C08J 5/243* (2021.05); *C08J 5/244* (2021.05); *C08J 5/249* (2021.05); *C08K 3/346* (2013.01); *C08K 3/36* (2013.01); *C08K 3/38* (2013.01); *C08K 3/40* (2013.01); *C08K 5/19* (2013.01); *C08K 5/21* (2013.01); *C08K 5/3155* (2013.01); *C08K 5/3445* (2013.01); *C08K 5/34922* (2013.01); *C08K 5/5313* (2013.01); *C08K 5/5357* (2013.01); *C09J 7/35* (2018.01); *C08K 2003/387* (2013.01); *C08L 2201/02* (2013.01); *C08L 2205/025* (2013.01); *C08L 2205/035* (2013.01); *C08L 2312/00* (2013.01); *C09J 2463/00* (2013.01)

(58) Field of Classification Search
None
See application file for complete search history.

(56) References Cited

U.S. PATENT DOCUMENTS 3,839,239 A * 10/1974 Godfried ............... B32B 5/26
528/109
4,529,467 A * 7/1985 Ward ..................... C09D 5/185
428/920

(Continued)

FOREIGN PATENT DOCUMENTS

| CN | 101200573 A | 6/2008 |
|---|---|---|
| CN | 108264729 A | 7/2018 |

(Continued)

OTHER PUBLICATIONS

Machine translation of JP-2018035300-A (no date).*

(Continued)

*Primary Examiner* — Michael J Feely
(74) *Attorney, Agent, or Firm* — Polsinelli, P.C.

(57) ABSTRACT

An epoxide resin for the manufacture of a fibre-reinforced composite material having fire retardant properties and/or for use as an adhesive or hot-melt adhesive having fire retardant properties, the epoxide resin being halogen-free and phenolic resin-free, the epoxide resin having:
- A. a mixture of (i) at least one first non-halogenated multifunctional epoxide-containing resin which has an epoxide functionality of greater than 2 and (ii) at least one second non-halogenated multifunctional epoxide-containing resin which has an epoxide functionality of less than or equal to 2;
- B. at least one catalyst for curing the mixture of epoxide-containing resins to form a cured epoxy resin; and
- C. a mixture of first, second and third fire retardant additives for reacting together to form an intumescent char when the cured epoxy resin is exposed to a fire, wherein (i) the first fire retardant additive comprises a blowing agent for generating a non-combustible gas, (ii) the second fire retardant additive comprises an acid donor for decomposing to form a phosphoric acid when the cured epoxy resin is exposed to a fire, and (iii) the third fire retardant additive comprises at least one or both of (a) a ceramic or glass material and (b) a ceramic or glass material precursor to form a ceramic or glass material when the cured epoxy resin is exposed to a fire.

28 Claims, 2 Drawing Sheets

(56) References Cited

U.S. PATENT DOCUMENTS

| | | | |
|---|---|---|---|
| 2008/0057314 A1* | 3/2008 | Levchik | C08J 5/04 |
| | | | 428/413 |
| 2010/0048766 A1 | 2/2010 | Cheng et al. | |
| 2015/0025176 A1 | 1/2015 | Eagle et al. | |
| 2016/0230001 A1 | 8/2016 | Spencer et al. | |

FOREIGN PATENT DOCUMENTS

| | | | |
|---|---|---|---|
| EP | 814121 A1 * | 12/1997 | C08K 3/04 |
| EP | 3333211 A1 | 6/2018 | |
| JP | 2018035300 A * | 3/2018 | C08L 63/00 |
| WO | 2011015611 A1 | 2/2011 | |
| WO | 2018117075 A1 | 6/2018 | |
| WO | 2019101923 A1 | 5/2019 | |

OTHER PUBLICATIONS

Combined Search and Exmination Report under Sections 17 and 18(3) in related GB application No. 1812680.5 issued on Dec. 11, 2019.

International Search Report and Written Opinion in related international application No. PCT/EP2019/070923 issued on Oct. 16, 2019.

International Preliminary Report on Patentability in related international application PCT/EP2019/070923 issued on Feb. 9, 2021.

* cited by examiner

FIRE-RETARDANT RESINS AND COMPOSITE MATERIALS

FIELD OF THE INVENTION

The present invention relates to fire-retardant resins, in particular epoxide resins for the manufacture of a fibre-reinforced composite material having fire retardant properties and/or for use as an adhesive or hot-melt adhesive having fire retardant properties. The present invention also relates to prepregs including such resins, and to fibre-reinforced composite materials made from such prepregs.

BACKGROUND

It is well known to use fibre-reinforced resin composite materials for the manufacture of structural components in a variety of industrial sectors. For some applications, the fibre-reinforced resin composite materials are manufactured from what are known in the art as prepregs—a prepreg comprises fibrous material pre-impregnated with a resin, and the amount of resin is matched to the amount of fibre so that after plural prepregs have been laid up into a mould and the resin has cured, optionally with a preliminary full wetting out of the fibrous material by the resin if the prepreg was initially not fully impregnated, a unitary fibre-reinforced composite material moulding is formed with the correct ratio of fibre to resin so that the material has the required material properties.

When a composite material is used for interior panel construction for mass transport applications, such as aerospace, trains, ferries, etc., in particular for the interiors of such vehicles, a fire, smoke and toxicity requirement is necessary. Historically, composite materials such as phenolic, cyanate-ester, sheet moulding compound (SMC), modified vinyl-ester and halogenated epoxides have been used for these applications.

Prepregs employing a phenolic-based resin have been historically used for interior panels in aerospace and mass transit applications for many decades. Although such phenolic resins offer excellent fire, smoke and toxicity ("FST") properties, there is an industry desire to seek replacement resin materials for such prepregs which offer improved health and safety performance, and lower-cost processing, than phenolic resins.

Phenolic resins for use in such prepregs are cured using a condensation reaction which releases volatiles and water during curing. This requires the use of press-curing under an imposed pressure in order to impart high pressures (6 bar) to reduce the expansion of large voids within the laminate during curing of the resin. Such voids would otherwise decrease the mechanical properties of the laminate. This press-curing increases processing cost. Secondly, the release of volatiles creates poor surface finishes that require significant filling and fairing of the cured components at a substantial additional cost. The release of volatile components, and solvents, also results in the need to take specific health and safety precautions when using such phenolic resins.

Addition-cured epoxide resins are well known in the composites industry to offer excellent mechanical properties and good health and safety properties. They are however, intrinsically flammable materials and, when used unmodified, are not suitable for applications where fire, smoke and toxicity properties are required. This has mitigated against their use in the aerospace and railway industry, particularly for interior components.

Fire retardant materials require a balance of flame spread (how long a material burns), smoke density, smoke toxicity (these parameters collectively being typically referred to by those skilled in the art as FST (flame, smoke and toxicity) properties) and energy of heat release and heat release rate (typically respectively referred to by those skilled in the art as HR/HRR). For railway and aerospace applications, currently known resin formulations for achieving these FST, HR and HRR properties include halogenated epoxides and phenolic resoles. Both of these options exhibit compromises with either fire retardant properties or mechanical properties.

Epoxides have commonly been modified with halogens (such as bromine and chlorine) in order to impart fire-retardant properties to the cured matrix. The two main disadvantages to this approach are high toxicity of smoke during combustion and poor health and safety characteristics associated with the material in both the uncured and cured state. Epoxide resins are known to exhibit excellent mechanical characteristics within reasonable cure parameters but results in high HR/HRR and smoke density (DS) values during cone calorimetry and smoke box testing.

A halogen-free fire retardant structural prepreg is required within the rail and aerospace industries to replace the predominantly used phenolic and brominated chemistry due to regulatory labelling, low mechanical properties and poor surface quality. The replacement must equal the superior fire retardant (FR) properties of a phenolic resin and meet the FST standard specifications for the application.

The Applicant's earlier WO-A-2011/015611 discloses a prepreg for the manufacture of a fibre-reinforced composite material, in which an epoxy-resin matrix comprises a non-halogenated epoxide-containing resin which has been chemically modified with a phosphorous-containing molecule which has been chemically reacted with the epoxide-containing molecule. In particular, that specification discloses DOPO-modified epoxide resins (DOPO being an acronym for dihydro oxa phosphapenanthrene oxide). These halogen-free DOPO-modified epoxide resins have previously been used as phenolic-resin replacements for the manufacture of vehicle interior components.

The Applicant's prior phosphorus technology improved the toxicity properties of brominated epoxides; however, the DOPO-modified epoxy resins tend to suffer from the technical problems of exhibiting reduced reactivity of the modified epoxide monomers, as result of steric hindrance caused by the DOPO groups, and exhibiting reduced prepreg impregnation. Also, the halogen-free DOPO-modified epoxide resins nevertheless still require fire retardant fillers, at high weight ratios of filler to resin, to achieve fire retardant properties equivalent to those achieved by phenolic resins.

To have adequate fire retardant capability, highly filled resin systems require direct substitution of resin with fillers, which reduces the mechanical properties of the cured prepreg.

SUMMARY OF THE INVENTION

The present inventors have addressed these problems of known composite materials and have aimed to provide fire-retardant fibre-reinforced composite materials, and prepregs therefor, which can exhibit good fire-retardant properties in combination with good mechanical properties, and in conjunction with good processability, with regard to cost and health and safety considerations. The present inventors have also aimed to provide fire-retardant resins for use as adhesives, either as "cold" adhesives, which are liquid or semi-solid and may be diluted by a solvent, and thereby flowable, at ambient temperatures, for example within the temperature range of from 20 to 30° C., or as hot-melt adhesives, which are liquid when heated above ambient temperatures, for example within the temperature range of greater than 50° C., and are typically solvent-free. Such adhesives can also exhibit good fire-retardant properties in combination with good mechanical properties after curing, and in conjunction with good tack and good processability, with regard to cost and health and safety considerations.

The present invention accordingly provides an epoxide resin for the manufacture of a fibre-reinforced composite material having fire retardant properties and/or for use as an adhesive or hot-melt adhesive having fire retardant properties, the epoxide resin being halogen-free and phenolic resin-free, the epoxide resin comprising:

A. a mixture of (i) at least one first non-halogenated multifunctional epoxide-containing resin which has an epoxide functionality of greater than 2 and (ii) at least one second non-halogenated multifunctional epoxide-containing resin which has an epoxide functionality of less than or equal to 2;

B. at least one catalyst for curing the mixture of epoxide-containing resins to form a cured epoxy resin; and C. a mixture of first, second and third fire retardant additives for reacting together to form an intumescent char when the cured epoxy resin is exposed to a fire, wherein (i) the first fire retardant additive comprises a blowing agent for generating a non-combustible gas, (ii) the second fire retardant additive comprises an acid donor for decomposing to form a phosphoric acid when the cured epoxy resin is exposed to a fire, and (iii) the third fire retardant additive comprises at least one or both of (a) a ceramic or glass material and (b) a ceramic or glass material precursor to form a ceramic or glass material when the cured epoxy resin is exposed to a fire.

Preferably, the first fire retardant additive comprises or consists of melamine. The first fire retardant additive may be present in a concentration of from 3.5 to 6 wt %, more preferably from 3.7 to 5.5 wt %, based on the weight of the epoxide resin.

Preferably, the second fire retardant additive comprises or consists of ammonium polyphosphate. Preferably, the ammonium polyphosphate of the second fire retardant additive is present in a concentration of from 20 to 35 wt %, more preferably from 27 to 32.5 wt %, still more preferably from 28.5 to 32 wt %, based on the weight of the epoxide resin.

Preferably, the third fire retardant additive comprises or consists of at least one of, or a mixture of any two or more of, the following: (i) a salt of a divalent metal cation and an oxoanion; (ii) a salt of a trivalent metal and an oxoanion; (iii) a glass material in particulate form; or (iv) a clay or ceramic material in particulate form.

In one preferred embodiment, the third fire retardant additive comprises or consists of a salt of a zinc or calcium cation and an oxoanion selected from borate, molybdate, phosphate, phosphite, hypophosphite and hydroxyl stannate. The third fire retardant additive may comprise or consist of a salt of aluminium and an oxoanion selected from borate, molybdate, phosphate, phosphite, hypophosphite and hydroxyl stannate. Alternatively, the third fire retardant additive may comprise or consist of an aluminosilicate clay in particulate form.

Preferably, the third fire retardant additive is present in a concentration of from 5 to 9 wt %, based on the weight of the epoxide resin, more preferably from 6 to 8 wt %, yet more preferably from 6.55 to 7.5 wt %, based on the weight of the epoxide resin.

Preferably, in the mixture of first, second and third fire retardant additives, the first, second and third fire retardant additives are present in a weight ratio of 1:6-6.5:1.3-1.7, typically a weight ratio of 1:6.1-6.4:1.5-1.6.

Preferably, in the mixture of first, second and third fire retardant additives, the second and third fire retardant additives are present in a weight ratio of greater than 4:1 to up to 4.5:1.

Preferably, component A, the mixture of epoxide-containing resins, and component C, the mixture of first, second and third fire retardant additives, are present in a weight ratio of 52-68:32-48, typically a weight ratio of 56-62:38-44.

Preferably, component C, the mixture of first, second and third fire retardant additives, provides the epoxide resin with a phosphorous content of from 7.5 to 10.5 wt %, more preferably from 8 to 9.25 wt %, based on based on the weight of the epoxide resin.

Preferably, component C, the mixture of first, second and third fire retardant additives, provides the epoxide resin with a nitrogen content of from 5.8 to 8.25 wt %, %, more preferably from 7 to 7.5 wt % based on based on the weight of the epoxide resin.

The inventors have found that within these desired and preferred ranges for the first, second and third fire retardant additives, progressively higher concentrations within these ranges tend to provide increased FST properties and in particular reduced heat release. The higher ends of the ranges provide a very high FST performance which may not be required for all applications. For example, the epoxy resin may be used in the production of epoxy resin composite material skins for honeycomb sandwich panels, or for the manufacture of a monolithic structure of a number of plies comprising epoxy resin.

In general, as the FST properties progressively increase, the mechanical properties tend progressively to decrease, since in general increasing the filler loading can reduce the tensile strength of cured epoxy resins. For each cured resin product to be manufactured incorporating the resin of the present invention, in practice there would be a balance between the desired or required FST properties and the desired or required mechanical properties, and this balance can be achieved by a selection of the filler concentrations and the epoxy resin components.

However, in general the present invention provides the combination of improved FST and mechanical properties in a cured epoxy resin, particularly when used in panels for vehicles, such as aircraft and railway interiors. These FST and mechanical properties are improved as compared to known epoxy resin systems, and the mechanical properties, and aesthetic appearance, are improved as compared to known phenolic resin systems, In particular, for some applications the concentrations of the first, second and third fire retardant additives may be towards the lower ends of the preferred concentration ranges in order to de-tune the FST heat release property in order to boost the mechanical performance of the cured resin, since as compared to a standard epoxy prepreg there is a reduction in tensile strength due to the high filler loading. Again, the lower concentrations of the first, second and third fire retardant additives may nevertheless provide a combination of FST and mechanical properties which are significantly enhanced as compared to conventional epoxy resin prepregs, and as compared to known prepregs that incorporate FST fillers.

Preferably, the epoxide-containing resin mixture of component A has a viscosity of from 1.5 to 15 Pa·s measured at a temperature of 85° C., in particular measured using a viscometer sold under the trade name Brookfield CAP2000HT viscometer, with a cone number 3, a rotational velocity of 50 rpm, and for a period of 20 seconds. A preferred viscosity range for this parameter measured under these conditions is from 2 to 10 Pa·s, for example from 7 to 10 Pa·s for manufacturing epoxy prepreg skins for honeycomb panels, for example for aerospace applications, and from 2 to 7 Pa·s for manufacturing epoxy prepreg panels for railway applications.

Preferably, in component A, the mixture of epoxide-containing resins comprises a blend comprising at least one first epoxide-containing resin which is solid at 20° C., and at least one second epoxide-containing resin which is liquid at 20° C., optionally further comprising at least one third epoxide-containing resin which is semi-solid at 20° C. In this specification, the term "semi solid" means materials which are neither true solids or true liquids but share properties of both states; therefore a semi-solid resin cannot be poured in the same way as a liquid resin however will deform and flow under pressure or shear unlike a solid resin. Optionally, the blend of epoxide-containing resins comprises from 20 to 40 wt % of at least one first epoxide-containing resin which is solid at 20° C., and from 10 to 30 wt % of at least one second epoxide-containing resin which is liquid at 20° C., optionally further comprising from 5 to 15 wt % of at least one third epoxide-containing resin which is semi-solid at 20° C., each wt % being based on the weight of the epoxide resin.

Preferably, in component A, the mixture of epoxide-containing resins, the at least one first non-halogenated multifunctional epoxide-containing resin which has an epoxide functionality of greater than 2 is present in a concentration of from 8 to 12 wt %, more preferably from 9 to 11 wt %, based on the weight of the epoxide resin.

Preferably, in component A, the mixture of epoxide-containing resins, the at least one first non-halogenated multifunctional epoxide-containing resin which has an epoxide functionality of greater than 2 comprises or consists of a solid bisphenol-A epoxy novolac resin.

Preferably, in component A the mixture of epoxide-containing resins, the at least one second non-halogenated multifunctional epoxide-containing resin which has an epoxide functionality of less than or equal to 2 is present in a concentration of from 45 to 52 wt %, more preferably from 47 to 50 wt %, based on the weight of the epoxide resin.

Preferably, in component A, the mixture of epoxide-containing resins, the at least one second non-halogenated multifunctional epoxide-containing resin which has an epoxide functionality of less than or equal to 2 comprises or consists of a mixture of a solid bisphenol-A epoxy resin and a liquid bisphenol-A epoxy resin, optionally in addition an epoxy novolac resin.

Preferably, in the mixture of a solid bisphenol-A epoxy resin and a liquid bisphenol-A epoxy resin, optionally in addition an epoxy novolac resin, the solid bisphenol-A epoxy resin is present in a concentration of from 22 to 26 wt %, the liquid bisphenol-A epoxy resin is present in a concentration of from 12 to 17 wt %, and the epoxy novolac resin is present in a concentration of from 8 to 12 wt %, each based on the weight of the epoxide resin.

More preferably, in the mixture of a solid bisphenol-A epoxy resin and a liquid bisphenol-A epoxy resin, optionally in addition an epoxy novolac resin, the solid bisphenol-A epoxy resin is present in a concentration of from 23 to 25 wt %, the liquid bisphenol-A epoxy resin is present in a concentration of from 13 to 15 wt %, and the epoxy novolac resin is present in a concentration of from 9 to 11 wt %, each based on the weight of the epoxide resin.

In some embodiments, the epoxide resin is free of any elastomeric material or elastomeric toughening additive. In other embodiments, for some applications the cured epoxy resin may require enhanced toughness, and the epoxide resin may comprise elastomeric material and/or a thermoplastic material as a toughening additive, the amount of toughening additive being controlled so as to provide the desired enhanced toughness without reducing the FST properties below a desired threshold. As described above, such carbon-containing toughening additive may lead to additional smoke generation upon combustion, but they may be used in applications with lower FST requirements.

Preferably, the at least one catalyst comprises plural catalysts, each having a respective curing temperature range, and the plural temperature ranges overlap to provide a cumulative curing temperature range for the epoxide-containing resin.

Preferably, the at least one catalyst for curing the epoxide-containing resin comprises or consists of a dicyanamide-based catalyst.

Preferably, the epoxide resin is free of any epoxide-containing molecule that has been chemically reacted with a phosphinic acid derivative or dihydro-oxa-phospha-phenanthrene-oxide (DOPO).

The epoxide resin further comprises at least one accelerator for the at least one catalyst, for example an imidazole-based accelerator and/or a urea-based accelerator.

Preferably, the epoxide resin further comprises at least one anti-settling agent for the at least one mineral filler. The at least one anti-settling agent preferably comprises silicon dioxide, optionally amorphous silicon dioxide, further optionally hydrophobic fumed silica. The at least one anti-settling agent is typically present in an amount of from 0.5 to 1.5 wt % based on the weight of the epoxide resin.

The present invention further provides a prepreg comprising the epoxide resin of the present invention and a fibrous reinforcement, wherein the epoxide resin forms an epoxide resin matrix which and at least partially impregnates the fibrous reinforcement.

The present invention further provides a fibre-reinforced composite material produced from the prepreg of the present invention.

The present invention also provides fibre-reinforced composite material produced from the prepreg of the present invention and to such a fibre-reinforced composite material adhered by the epoxy resin matrix to a core material, for example a honeycomb core material.

The present invention is predicated on the finding by the present inventors that the selection and ratio optimisation of a specific group of fire retardant fillers can unexpectedly realise a prepreg formulation that offers the combination of (i) high thermal stability to facilitate ease of impregnation, and (ii) low steric hindrance to allow low temperature/fast curing whilst maximising thermal, mechanical and FST properties not traditionally achievable with mineral-filled resin compositions.

The preferred embodiments of the present invention provide a blend of fire retardant (FR) fillers in a blend of bi-functional and multifunctional epoxy resins in a base resin. This provides high intumescent FR properties but allows sufficient resin flow for processing and fibre wet-out whilst achieving high cross-linking on curing to maintain mechanical properties of the resultant cured epoxy resin.

The preferred embodiments of the present invention provide that the FR filler blend comprises or consists of synergistic compounds, namely an acid donor for decomposing to form a phosphoric acid when the cured epoxy resin is exposed to a fire, such as ammonium polyphosphate, and a glass or ceramic, or precursor thereof, such as glass microbeads or zinc borate, which act as char promoters within a condensed phase, which is then blown by an endothermic blowing agent, such as melamine, to create an intumescent protective layer.

In one preferred aspect, the present invention has developed a fire retardant epoxide based structural prepreg. The base epoxide resin system used within this prepreg has been developed with a low viscosity to allow high filler content, but designed to maximise mechanical performance. For this development, as the filler content was increased and viscosity reduced, the functionality of the resin system was increased to counteract the loss of mechanical properties. A combination of both highly crosslinking multifunctional and toughening chain extended bi-functional epoxy resins was used to maintain mechanical performance.

During prepreg manufacture, the resin is heated to melt the resin and thereby lower the resin viscosity, in order to achieve fibre impregnation by the resin. Due to the low viscosity nature of the resultant hot-melt resin, sufficient resin flow for processing and fibre wet out is achieved. A toughening elastomer such as rubber and a toughening thermoplastic were both avoided, as these carbon-containing toughening components would tend to increase smoke production. Therefore toughness was maximised through use of a chain extended bi-functional epoxy resin system.

The filler blend was tailored to the epoxide resin system in weight ratios designed to optimise the intumescence, i.e. the formation of a foam "char" at the surface to insulate the polymer surface, which is created on heat exposure. The intumescence shields the polymer-containing laminate from oxygen and heat to prevent further combustion.

The base epoxide resin system was combined with a catalyst/accelerator system which achieved a reduced reaction onset temperature, and consequently low cure temperatures, for example a minimum cure temperature of 85° C., were possible without hindering the mechanical properties such as a high glass transition temperature (Tg) which are achieved by having a high cross-link density in the cured epoxy resin.

Due to the low viscosity nature of the resin matrix, the highly filled resin system is capable of being processed as a prepreg material and maintains thermal stability to allow a high level of fibre wet-out during resin impregnation.

BRIEF DESCRIPTION OF THE DRAWINGS

Embodiments of the present invention will now be described in greater detail by way of example only, with reference to the accompanying drawings, in which.

DETAILED DESCRIPTION

Figure 1:
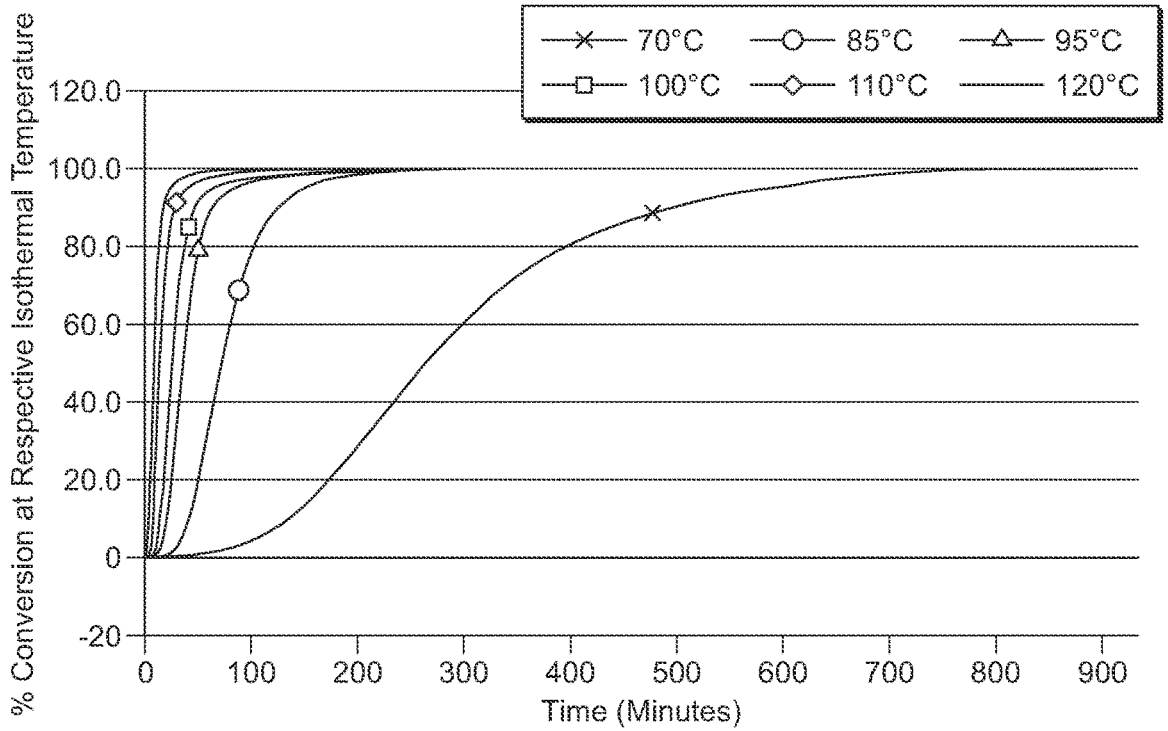
FIG. 1 is a graph produced by isothermal DSC testing showing the relationship between epoxide monomer conversion and time at various curing temperatures for an epoxide resin in accordance with an Example of the present invention.

The present invention is predicated on the finding by the present inventors that the combination of (i) a specific epoxide-containing resin system to provide a low viscosity prior to curing and a high cross-link density after curing and (ii) a specific blend of three fire retardant fillers can provide the combination a cured epoxy resin with high quality fire-retardancy and structural properties, together with good processability and cost for the uncured epoxide resin.

In developing the fibre-reinforced composite material of the present invention, the present inventors aimed to employ an epoxide resin as the matrix resin for the composite material, and to select epoxide functionality to achieve a high cross-link density, which in turn enhances the toughness of the cured resin matrix, which otherwise would be significantly reduced by the addition of the fire retardant fillers. The cured epoxy resin matrix can bond satisfactorily to honeycomb cores for sandwich panel construction as used in interior panels incorporated into vehicles, such as aircraft and train, interiors.

The cured epoxy resin can also function as an adhesive to bond satisfactorily to a variety of substrates, for example also to be incorporated into vehicles, such as aircraft and train, interiors.

The fire retardance and smoke release characteristics of the epoxide resin can be significantly improved by the addition of the specific blend of three fire retardant fillers, and can be of a sufficient level to act as a global replacement for phenolic materials for such vehicle applications. This is a major technical and commercial advance.

However, a primary advantage of the present invention is that good FST properties can be achieved in an epoxy resin incorporating FST fillers, which nevertheless, despite the reasonably high filler content, provides good mechanical properties in the resultant cured epoxy resin composite material component.

The epoxide resin employed in accordance with the embodiments of the present invention is an addition-cured resin. Therefore no volatiles are released during cure. As compared to condensation-cured resins, such as phenolic resins, this provides the advantage of allowing components to be cured using lower-cost vacuum bag technology with significantly reduced refinishing and processing costs.

The epoxide resin employed in accordance with the embodiments of the present invention is a halogen-free, epoxide matrix resin and unlike phenolic systems, does not contain residual phenol or solvents. This means that it can be used in aircraft interior parts such as air-conditioning ducting without the risk of toxic phenol being leached into the passenger air supply. Its high toughness facilitates its application in aircraft flooring, previously the domain of toughened halogenated epoxides, with the additional advantage that the halogen-free, epoxide matrix resin avoids the smoke toxicity issues associated with halogenated epoxides.

Fire-retardant fillers were added to the epoxy resin matrix employed in accordance with the embodiments of the present invention to improve the smoke release and smoke toxicity properties of the matrix resin.

The present invention has particular application in the manufacture of multilaminar composite sandwich panels comprising a central core, for example of a honeycomb material itself known in the art, and two opposed outer plies comprising fibre-reinforced composite material incorporating a resin matrix produced in accordance with the present invention.

The resin matrix must display two main behaviours in order to achieve sufficient peel adhesion to a core such as a honeycomb core:
a. The matrix resin must flow sufficiently during cure in order to form sufficient contact area with the honeycomb cell surface to achieve good adhesion. Yet flow must be adequately 'controlled' to prevent excessive resin flow resulting in resin scarce areas of the prepreg laminate skins.
b. The matrix must exhibit toughness to withstand multiple impacts during service and resist premature matrix cracking, for example which would result in reduced peel strength.

The present inventors found that the use of a specific blend of multifunctional epoxide resins provided enhanced toughness in the resultant cured resin matrix as a result of cross-linking. Consequently, conventional elastomeric or thermoplastic toughening additives, such as a dispersed nitrile rubber in the resin matrix, can be avoided, which is advantageous since such additives would otherwise provide a source of carbon on combustion which would increase the smoke density.

The various components of the epoxide-resin matrix used in accordance with the preferred embodiments of the present invention are discussed in greater detail below.

Epoxide Component

The epoxide resin comprises a mixture of (i) at least one first non-halogenated multifunctional epoxide-containing resin which has an epoxide functionality of greater than 2 and (ii) at least one second non-halogenated multifunctional epoxide-containing resin which has an epoxide functionality of less than or equal to 2.

Preferably, the epoxide-containing resin mixture of component A in the epoxide-resin has a viscosity of from 1.5 to 15 Pa·s measured at a temperature of 85° C., in particular measured using a viscometer sold under the trade name Brookfield CAP2000HT viscometer, with a cone number 3, a rotational velocity of 50 rpm, and for a period of 20 seconds. A preferred viscosity range for this parameter measured under these conditions is for example from 7 to 10 Pa·s for manufacturing epoxy prepreg skins for honeycomb panels, for example for aerospace applications, and from 2 to 7 Pa·s for manufacturing epoxy prepreg panels for railway applications. To prevent the addition of fillers increasing resin, the final resin viscosity is optimised by balancing the liquid epoxide functional resin to the higher-functionality epoxide resin blend.

Preferably, in component A, the mixture of epoxide-containing resins comprises a blend comprising at least one first epoxide-containing resin which is solid at 20° C., and at least one second epoxide-containing resin which is liquid at 20° C., optionally further comprising at least one third epoxide-containing resin which is semi-solid. In this specification, the term "semi-solid" means materials which are neither true solids or true liquids but shares the properties of both states. Therefore a semi-solid resin cannot be poured in the same way as a liquid resin however will deform and flow under pressure or shear unlike a solid resin at 20° C.

Optionally, the blend comprises from 20 to 40 wt % of at least one first epoxide-containing resin which is solid at 20° C., and from 10 to 30 wt % of at least one second epoxide-containing resin which is liquid at 20° C., optionally further comprising from 5 to 15 wt % of at least one third epoxide-containing resin which is semi-solid at 20° C., each wt % being based on the weight of the epoxide resin.

Preferably, in the mixture of epoxide-containing resins, the at least one first non-halogenated multifunctional epoxide-containing resin which has an epoxide functionality of greater than 2 is present in a concentration of from 8 to 12 wt %, more preferably from 9 to 11 wt %, based on the weight of the epoxide resin. That resin may comprise or consist of a solid bisphenol-A epoxy novolac resin.

Preferably, in the mixture of epoxide-containing resins, the at least one second non-halogenated multifunctional epoxide-containing resin which has an epoxide functionality of less than or equal to 2 is present in a concentration of from 45 to 52 wt %, more preferably from 47 to 50 wt %, based on the weight of the epoxide resin. That resin may comprise or consist of a mixture of a solid bisphenol-A epoxy resin and a liquid bisphenol-A epoxy resin, optionally in addition an epoxy novolac resin. The solid bisphenol-A epoxy resin may be present in a concentration of from 22 to 26 wt %, the liquid bisphenol-A epoxy resin may be present in a concentration of from 12 to 17 wt %, and the optional epoxy novolac resin may be present in a concentration of from 8 to 12 wt %, each based on the weight of the epoxide resin. Alternatively, the solid bisphenol-A epoxy resin may be present in a concentration of from 23 to 25 wt %, the liquid bisphenol-A epoxy resin may be present in a concentration of from 13 to 15 wt %, and the optional epoxy novolac resin may be present in a concentration of from 9 to 11 wt %, each based on the weight of the epoxide resin.

Preferably, to achieve high FST properties the epoxide resin is free of any elastomeric material or elastomeric toughening additive. In particular, the epoxide-containing resin preferably is free of any toughening additives which comprise an elastomer and/or a thermoplastic having a molecule capable of reacting with the epoxide molecule so as to be chemically bonded as a co-monomer into the epoxide resin matrix. In contrast, the epoxy resin system is formulated to provide sufficient tack to the adhesive, hot-melt adhesive, or prepreg and to provide enhanced toughness of the cured epoxy resin.

In alternative embodiments for applications with lower FST requirements but requiring high toughness of the cured epoxy resin, such any elastomeric material or elastomeric toughening additive, or thermoplastic toughening additives may be present.

Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof.

In a particularly preferred embodiment, the epoxide-containing resin is a solid at room temperature, 20 degrees Centigrade.

The epoxide-containing resin is formulated to comprise a mixture of solid and liquid resins, and optionally also semi-solid resins, so that when heated during curing the epoxide resin has a liquid content, resulting from liquefied epoxide resins and the associated catalyst system, and a solid content, resulting from the fillers, which has a reduced viscosity of the resin matrix to allow hot-melt processing, prepreg flexibility (drape) and sufficient prepreg tack to allow ease of handling.

The epoxide-containing resin may further comprise a catalyst carrier which acts to assist incorporation of the latent catalyst for the epoxide resin into the composition. Typically, the catalyst carrier comprises a diglycidyl ether of bisphenol F liquid resin. For example, the catalyst carrier may comprise a diglycidyl ether of bisphenol F liquid resin available in commerce under the trade name Epikote 862 from Resolution Performance Products. The catalyst carrier may typically be present in the resin composition in an amount of up to 10 wt %, based on the total weight of the resin composition.

Preferably, the epoxide resin is free of any epoxide-containing molecule that has been chemically reacted with a phosphinic acid derivative or dihydro-oxa-phospha-phenanthrene-oxide (DOPO).

Catalyst/Curing Agent Component

The epoxide-containing resin further comprises as a second component a catalyst or curing agent suitable for curing epoxide resins, optionally together with at least one additional catalyst additive or modifier. Any suitable catalyst may be used. The catalyst will be selected to correspond to the resin used. The catalyst may be accelerated. The catalyst or curing agent may typically be selected from a dicyandiamide, sulphanilamide, urone, urea, imidazole, amine, halogenated boron complex, anhydride, lewis base, phenolic novolac, or a nitrogen containing compound. Latent curing agents such as dicyandiamide, femurone and imidazole may be cured. Suitable accelerators include Diuron, Monuron, Fenuron, Chlortoluron, urea of toluene diisocyanate and other substituted homologues.

Preferably, the at least one catalyst for curing the epoxide-containing resin comprises or consists of a dicyanamide-based catalyst. Typically, the curing catalyst for the epoxide-containing resin is dicyandiamide, most preferably being in micronized form, and such a catalyst is available in commerce under the trade name Amicure CG1200E from Air Products Inc. Such a dicyandiamide-based catalyst has a high functionality to enable the resultant cured epoxy resin to have high cross-linking density and thereby a high glass transition temperature (Tg).

Optionally, the at least one catalyst comprises plural catalysts, each having a respective curing temperature range, and the plural temperature ranges overlap to provide a cumulative curing temperature range for the epoxide-containing resin.

The epoxide resin typically further comprises at least one accelerator for the at least one catalyst, for example an imidazole-based accelerator and/or a urea-based accelerator, typically a substituted/blocked urea. Such an imidazole-based accelerator can reduce the onset of reaction, thereby allowing curing at a reduced temperature. The imidazole-based accelerator preferably can be selected to provide a shelf life of the prepreg which is sufficiently long, for example >4 weeks at 21° C., to enable a useable shelf and storage life. Such a substituted/blocked urea can accelerate and control the curing profile.

The curing catalyst may typically be present in the resin composition in an amount of from 1 to 15 wt %, more typically from 6 to 12 wt %, based on the total weight of the epoxide component A of the resin composition. In one example, the catalyst is added at 4.9 wt % of the total composition of components A, B and C, which may correspond to 8.7 wt % of component A. Too low an amount of the curing catalyst may cause a reduced cure of the resin material, whereas too high an amount may cause an excessively exothermic cure.

The curing catalyst may be combined with an additional catalyst additive to reduce the activation energy, and hence the curing temperature, of the primary curing catalyst such as dicyandiamide. Such an additive may comprise urone, which has the chemical formula N,N"-(4-methyl-m-phenylene)bis[N',N'-dimethylurea] and is available in commerce under the trade name Amicure UR2T from Evonik Industries Inc. or under the trade name UR500 from Alzchem AG.

Such an additive may typically be present in the resin composition in an amount of up to 15 wt %, more typically from 1 to 4 wt %, based on the total weight of the epoxide component A of the resin composition. In one example, the urone is added at 0.67 wt % of the total composition of components A, B and C, which may correspond to 1.18 wt % of component A. A low amount of the additional catalyst additive may cause a reduced cure speed and/or reduced curing temperature of the resin material, whereas too high an amount may cause reduced fire, smoke and toxicity resistance properties.

The curing catalyst may be yet further be combined with an additional additive imidazole-based catalyst or curing agent provided to further reduce the activation energy, and hence the curing temperature, of the urone. In addition, the C=N bonds present in imidazole have been shown to improve the fire-retardancy properties of the resultant cured epoxide-resin compared to other catalysts. Such an imidazole-based catalyst or curing agent is available in commerce under the trade name 2MZ-Azine-S from Shikoku, Japan.

The imidazole-based catalyst or curing agent may typically be present in the resin composition in an amount of up to 15 wt %, more typically from 1 to 4 wt %, based on the total weight of the epoxide component A of the resin composition. In one example, the imidazole-based catalyst is added at 2 wt % of the total composition of components A, B and C, which may correspond to 3.5 wt % of component A. A low amount of the imidazole-based catalyst or curing agent may cause a reduced cure speed and/or reduced curing temperature of the resin material, whereas too high an amount may cause an excessively exothermic cure.

Fire-Retardant/Smoke Suppressant Fillers

The epoxide resin comprises as a third component a mixture of first, second and third fire retardant additives for reacting together to form an intumescent char when the cured epoxy resin is exposed to a fire. These fire retardant additives comprises fillers used to promote fire-retardancy and/or reduce generation of smoke, opacity of smoke or toxicity of smoke.

Optionally, such fillers are dispersed homogeneously throughout the resin matrix. However, the dispersion may alternatively be heterogeneous, for example being present in surface layers. Many improvements in properties do not require such homogeneous dispersion and so this may result in a material which is thus either over-engineered for the application or, conversely, reduced in one or more other properties The first fire retardant additive comprises a blowing agent for generating a non-combustible gas. Preferably, the first fire retardant additive comprises or consists of melamine. The first fire retardant additive may be present in a concentration of from 3.5 to 6 wt %, more preferably from 3.7 to 5.5 wt %, based on the weight of the epoxide resin.

The second fire retardant additive comprises an acid donor for decomposing to form a phosphoric acid when the cured epoxy resin is exposed to a fire, for example ammonium polyphosphate. Preferably, the ammonium polyphosphate of the second fire retardant additive is present in a concentration of from 20 to 35 wt %, more preferably from 27 to 32.5 wt %, still more preferably from 28.5 to 32 wt %, based on the weight of the epoxide resin. An ammonium polyphosphate fire retardant mineral filler is available under the trade name Exolit AP 422 from Clariant, Leeds, UK.

The third fire retardant additive comprises at least one or both of (a) a ceramic or glass material and (b) a ceramic or glass material precursor to form a ceramic or glass material when the cured epoxy resin is exposed to a fire.

Preferably, the third fire retardant additive comprises or consists of at least one of, or a mixture of any two or more of, the following: (i) a salt of a divalent metal cation and an oxoanion; (ii) a salt of a trivalent metal and an oxoanion; (iii) a glass material in particulate form; or (iv) a clay or ceramic material in particulate form.

In one preferred embodiment, the third fire retardant additive comprises or consists of a salt of a zinc or calcium cation and an oxoanion selected from borate, molybdate, phosphate, phosphite, hypophosphite and hydroxyl stannate. The third fire retardant additive may comprise or consist of a salt of aluminium and an oxoanion selected from borate, molybdate, phosphate, phosphite, hypophosphite and hydroxyl stannate. Alternatively, the third fire retardant additive may comprise or consist of an aluminosilicate clay in particulate form. One particular smoke suppressant mineral filler is zinc borate, available in commerce under the trade name Firebrake ZB from Borax Europe Limited.

In another preferred embodiment, the third fire retardant additive comprises or consists of a glass material in particulate form, for example glass microbeads having a diameter d(0.5) within the range of from 15 to 30 microns, and optionally a diameter d(0.9) within the range of from 30 to 80 microns.

In another preferred embodiment, the third fire retardant additive comprises or consists of a clay or ceramic material in particulate form, for example an aluminosilicate clay.

Preferably, the third fire retardant additive is present in a concentration of from 5 to 9 wt %, based on the weight of the epoxide resin, more preferably from 6 to 8 wt %, yet more preferably from 6.75 to 7.5 wt %, based on the weight of the epoxide resin.

Preferably, in the mixture of first, second and third fire retardant additives, the first, second and third fire retardant additives are present in a weight ratio of 1:6-6.5:1.3-1.7, typically a weight ratio of 1:6.1-6.4:1.5-1.6.

Preferably, in the mixture of first, second and third fire retardant additives, the second and third fire retardant additives are present in a weight ratio of greater than 4:1 to up to 4.5:1.

Preferably, the mixture of epoxide-containing resins, and the mixture of first, second and third fire retardant additives, are present in a weight ratio of 52-68:32-48, typically a weight ratio of 56-62:38-44.

Preferably, the mixture of first, second and third fire retardant additives, provides the epoxy resin with a phosporous content of from 7.5 to 10.5 wt %, more preferably from 8 to 9.25 wt %, based on based on the weight of the epoxide resin.

Preferably, the mixture of first, second and third fire retardant additives, provides the epoxy resin with a nitrogen content of from 5.8 to 8.25 wt %, %, more preferably from 7 to 7.5 wt % based on based on the weight of the epoxide resin.

The acid donor, for example ammonium polyphosphate, can act both in the condensed and gas phase during a fire. Ammonium polyphosphate decomposes at >240° C. releasing water and ammonia to cool and dilute the gaseous phase, and releasing phosphoric acid. The phosphoric acid acts as an acid catalyst in the dehydration of carbon-based polyalcohols to form heat-unstable phosphate esters. The esters decompose to release carbon dioxide and phosphoric acid is regenerated. The carbonaceous char shields the substrate from attack by oxygen and radiant heat. In the gas phase, the release of non-flammable carbon dioxide helps to dilute the oxygen of the air and flammable decomposition products of the substrate. Any P* and PO* radicals liberated during the combustion can act as scavengers of oxygen radicals, thereby reducing the energy of the radicals in the gas phase and reducing volatilization.

The inorganic mineral fillers such as zinc borate act as a multifunctional fire retardant and smoke suppressant. The metal, e.g. zinc, species remains in the condensed phase and acts as a catalyst for char formation by promoting cross-linking in the expanded resin protective surface layer. Char formation in turn supresses smoke formation which is reinforced by the glass-forming ability of metal oxides, e.g. borate oxides, which can increase mechanical performance of char/intumescence.

The acid donor, for example ammonium polyphosphate, and the metal cation/oxyanion, for example zinc borate, interact synergistically whilst degrading, thereby stabilizing the phosphorus species.

Without being bound by any theory, it is believed by the present inventors that the glass beads work synergistically with the ammonium polyphosphate by the glass beads forming a fused/protective layer that minimises volatile/gas phase release. However typically, smoke density is also reduced through ant one or more of reduced carbon-carbon bond saturation (i.e. alkanes burn cleaner than alkenes), lower carbon content in the resin and by allowing complete combustion (i.e. ensuring $CO_2$ rather than CO is formed).

The blowing agent, for example melamine, degrades at combustion temperatures, for example >300° C., thereby releasing nitrogen gas which forces the char formation to intumesce.

The weight ratio of the three fillers of the blend of first, second and third fire retardant additives can produce a strong, toughened intumescence which protects the polymeric substrate from further heat and oxygen, and traps volatiles to prevent further combustion.

If the fire retardant and smoke suppressant mineral fillers, are present in too high an amount, the resin composition may exhibit high viscosity, reduced toughness and poor adhesion, for example to a core, whereas if the fire retardant mineral filler is present in too low an amount, the fire, smoke and toxicity resistance properties may be reduced.

The mineral fillers may optionally be provided together with a filler dispersion additive to aid wetting and dispersion of fillers during manufacture of the matrix resin. Such a filler dispersion additive is available in commerce under the trade name BYK W980 from BYK Chemie, Wesel, Germany. The filler dispersion additive may typically be present in the resin composition in an amount of up to 1 wt %, based on the total weight of the resin composition.

Further Additives

The epoxide-containing matrix resin may comprise additional additives known in the art to improve resin processing or properties, or both.

In particular, an anti-settling agent may be provided to reduce or prevent settling of the at least one mineral filler, for example in the resin formulation during storage/processing and/or during curing of the resin. The anti-settling agent may also control resin flow during resin curing. In addition, such an agent can prevent settling of powder particles, such as the fire-retardant and/or smoke suppressant fillers. A typical anti-settling agent comprises silicon dioxide, optionally amorphous silicon dioxide, most typically hydrophobic fumed silica, for example available under the trade name Cabot TS-720. The at least one anti-settling agent is typically present in an amount of from 0.5 to 1.5 wt % based on the weight of the epoxide resin.

In a prepreg, the fibrous reinforcement may comprise one or more materials such as glass fibre, aramid fibre, carbon fibre, or PAN or pitch based carbon fibre. The present invention is particularly directed to an epoxide resin system which has sufficiently low viscosity during impregnation so that carbon fibres, which are generally harder to impregnate than glass fibres, can be reliably and uniformly impregnated to form a carbon-fibre prepreg.

The modified epoxide-containing matrix resin of preferred embodiments of the present invention may be used in prepregs and composite materials of the present invention, which in turn have particular application for use for interior panel construction for mass transport applications where a fire, smoke and toxicity requirement is necessary. The composite materials made using such a resin can provide significant advantages over the known resins discussed above, such as phenolic, cyanate-ester, SMC, modified vinyl-ester and halogenated epoxies which have been used in the past for these applications.

The epoxide-containing matrix resin of the preferred embodiments of the present invention may be used in a number of applications.

The epoxide-containing matrix resin of the preferred embodiments of the present invention may be used in structural applications where fire, smoke and toxicity performance that is similar to phenolic materials is required yet with greatly increased mechanical properties. Additional advantages include ease of processing and reduced refinishing which allow substantial cost reductions especially on large civil structures. Phenolic panels tend to be dark brown in colour and so are commonly painted to achieve the desired component colour. Problems can occur during service whereby if the material is scratched; the base colour of the phenolic becomes highly visible. The epoxide-containing matrix resin of the preferred embodiments of the present invention may be white in colour which reduces the visual impact of such scratching during use.

The modified epoxide-containing matrix resin of preferred embodiments of the present invention may alternatively be used in adhesives or hot-melt adhesives.

The resultant cured resins exhibit FST properties.

The epoxide-containing matrix resin of the preferred embodiments of the present invention can provide a number of technical benefits as compared to known prepregs and composite materials having fire and/or smoke resistance. In particular, there may be provided in accordance with the present invention: a phenol-free alternative to phenolic prepregs; good regulatory labelling for handling uncured material; halogen-free for reduced toxicity during combustion compared to brominated systems; no volatiles are released during cure—improved mechanical properties; can achieve increased filler loadings without forsaking processing capability or fibre wet-out; does not require high-pressure press tooling to process, can use low-cost vacuum-bag technology; can achieve an out-of-autoclave cure; high-quality surface finish "straight from tooling"—does not require expensive and time-consuming refinishing, no pitting, reduced time and cost to rework surface in post processing stages; higher reactivity allowing either lower temperature curing and/or faster curing compared to halogenated and DOPO modified systems; reduced material cost through use of lower cost chemistry; and pale-colour—requires less surface coating to achieve desired aesthetic and results in increased longevity during operation (i.e. scratches etc. are less visible).

The present invention can solve a number of problems associated with known fire retardant epoxide based structural prepregs, and in particular can provide the combination of high mechanical properties combined with excellent FST properties for an epoxy system using a specific blend of an intumescent filler system.

The modified epoxide material produced in accordance with the present invention may be used by manufactures of composite prepregs for use in a wide-range of fire-retardant applications. The prepreg would offer a unique alternative to a wide-range of existing fire-retardant materials including (but not limited to) phenolics, halogenated epoxies, and cyanate esters but with significant advantages of the combination of enhanced fire-retardant, smoke and toxicity (FST) properties and mechanical properties, together with good resin processing.

EXAMPLES

The epoxide-containing resin of the preferred embodiments of the present invention is further illustrated with reference to the following non-limiting examples.

The development of the epoxide-containing resin of the present invention required the determination of three discrete parameters essential for providing a fire retardant epoxy resin having high structural properties, namely high fire-retardancy, high smoke suppression and low toxicity. In addition to meeting these performance criteria, it was necessary to ensure that the epoxide-containing matrix resin was suitable for manufacture using hot-melt (non-solvent impregnation) impregnation methods. To benchmark the epoxide-containing matrix resin against current industry standards, the resin was tested to determine that it had thermal, mechanical and handling properties which complied with the specification established by Airbus Industries, Toulouse, France for interior FST materials, in particular (AIMS 05-10-034-01).

Example 1

A resin composition was formulated as set out in Table 1 (which had the applicant's product code SPX22703). The base epoxide resin comprised a blend of semi-solid, solid and liquid epoxide resin monomers of component A.

The base epoxide resin blend was mixed with the blend of ammonium polyphosphate, zinc borate and melamine fire retardant additives, which is component C, as set out in Table 1. The resin composition further comprised hydrophobic fumed silica as an anti-settling agent, sold under the trade name Cabot TS-720.

The resin composition further comprised, as component B and in wt % values with respect to the combination of components A, B and C, 2.25 wt % of dicyandiamide, in micronized form, as a primary resin curing catalyst, 0.67 wt % of urone as an additional catalyst additive to reduce primary catalyst activation energy, and 2.02 wt % of an imidazole-based catalyst additive to further reduce the primary catalyst activation energy.

The resin constituents liquefied on heating to 85° C. and component A had a viscosity of 5.5+/−0.6 Pa·s measured at 85° C., and measured using a viscometer sold under the trade name Brookfield CAP2000HT viscometer, with a cone number 3, a rotational velocity of 50 rpm, and for a period of 20 seconds.

The base resin, comprising the combination of components A and C, i.e. the resin and fillers, had a base resin viscosity of 258+/−26 Pa·s measured at 85° C., and measured using a viscometer sold under the trade name Brookfield CAP2000HT viscometer, with a cone number 3, a rotational velocity of 50 rpm, and for a period of 20 seconds.

The resin was used to make a prepreg, which comprised 46 wt % of the resin composition and 54 wt % of a glass fibre fabric with a satin weave, in particular a 7781 style 8H satin glass fabric, which was then cured.

The curing temperature was varied, and a series of isothermal differential scanning calorimetry (DSC) plots of the cure profile were measured. The results are shown in FIG. 1, and these plots show the speed of cure conversion at different curing temperatures. FIG. 1 shows that there is a trend of increasing isothermal temperatures to reduce the time to 100% cure conversion, the latter parameter being the time to reach the maximum cure at a given cure temperature.

Figure 2:
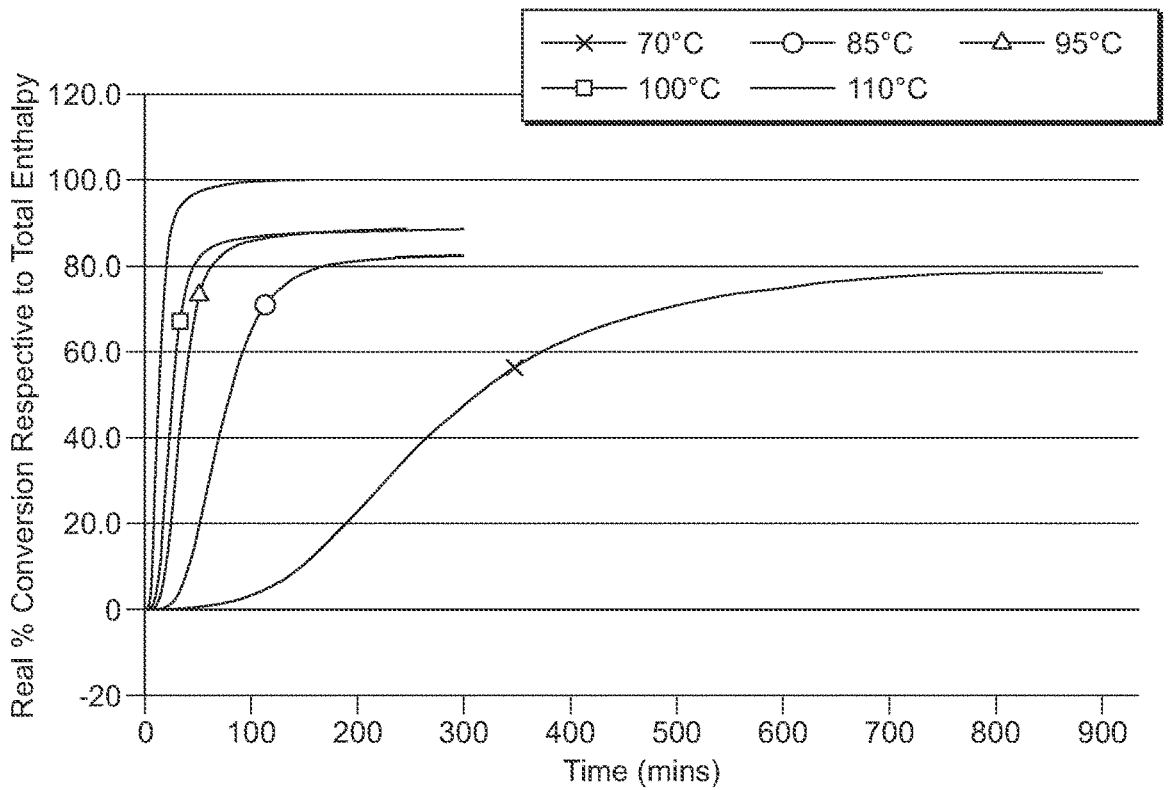
FIG. 2 is a graph produced by isothermal DSC testing showing the relationship between epoxide monomer conversion, as a percentage of total enthalpy, and time at various curing temperatures for the epoxide resin tested in FIG. 1.

FIG. 2 correspondingly shows the actual cure conversion, calculated as a percentage of the total possible enthalpy observed in a dynamic DSC trace. As can be seen, a reduction in isothermal cure temperature, reduces the cure conversion, and therefore would increase the amount of residual uncured material within the resultant composite material laminate.

The resin system of Example 1 had a minimum cure temperature of 85° C., and a cure dwell time at that minimum cure temperature of 5 hours. Alternatively, when the resin system of Example 1 was subjected to a faster cure at a higher temperature of 120° C., the cure dwell time at the faster cure temperature was only 40 minutes.

One plot in FIG. 2 shows 80% cure conversion after 5 hours at 85° C.

The fire-retardancy of the prepreg resin of Example 1 in accordance with the present invention was tested in the laboratory for fire-retardant properties, in accordance with a number of industry standard FST tests. The tests were conducted by a UKAS-accredited fire testing agency external to the Applicant. The Maximum Average Rate of Heat Release MAHRE (kWm$^{-2}$) and the Maximum Smoke Density (DSmax), smoke density being a dimensionless parameter, were measured, and categorised according to the EN45545 Rail Fire standard for exterior structural parts (R7) dependant on the use of train location (Overland train (HL1), Overland train with use of tunnels (HL2), Underground Trains (HL3)). The results are shown in Table 1.

It may be seen that the resin of Example 1 exhibited very low MAHRE, 37 kWm$^{-2}$, and smoke density DSmax, 202, for an epoxide resin. The resin of Example 1 was found to pass the R7/HL3 specification.

Example 2

An alternative resin formulation as shown in Table 1 was used as Example 2 (which had the applicant's product code SPX25225). As compared to Example 1, primarily the modification was that glass microbeads were used instead of zinc borate. Additionally, the formulation comprised carbon Monarch, a carbon powder supplied by Cabot, which is also referred to as in the art as carbon black and is a common pigment for making black prepreg materials.

Again, it may be seen that the resin of Example 2 exhibited very low MAHRE, 36 kWm$^{-2}$, and smoke density DSmax, 163, for an epoxide resin.

Example 3

An alternative resin formulation as shown in Table 1 was used as Example 3 (which had the applicant's product code SPX25211). As compared to Example 1, again glass microbeads were used instead of zinc borate. Additionally, the formulation comprised titanium dioxide as a whitening pigment.

Again, it may be seen that the resin of Example 3 exhibited very low MAHRE, 58 kWm$^{-2}$, and smoke density DSmax, 67 for an epoxide resin.

The mechanical properties of the cured resin were tested. An 8 ply 7781 glass fabric monolithic panel was made and the Interlaminar Shear Strength (ILSS) was tested; the value was 58 MPa. The same panel was tested for flexural strength and flexural modulus; the value of flexural strength was 558 MPa and the value of flexural modulus was 20 GPa. Furthermore, a sandwich panel having a two ply skin with the same glass fabric was made and the Climbing Drum Peel Strength was tested; the value was 257 N/75 mm.

These tested FST and mechanical properties showed that the epoxide resin of the present invention, when used to form prepregs that are subsequently used to form fibre-reinforced cured epoxy resin matrix composite materials, for example in the form of panels, can exhibit good mechanical properties, in conjunction with good FST properties.

Comparative Example 1

Figure 3:
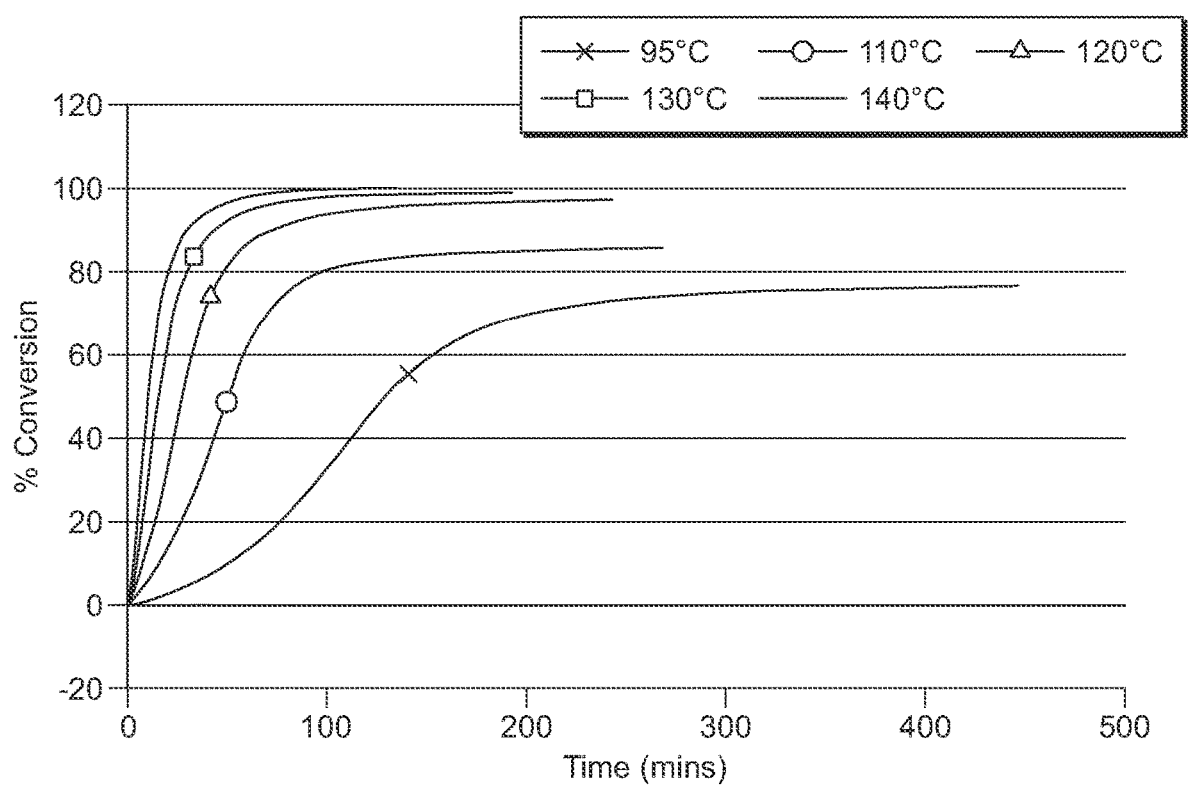
FIG. 3 is a graph produced by isothermal DSC testing showing the relationship between epoxide monomer conversion, as a percentage of total enthalpy, and time at various curing temperatures for an epoxide resin in accordance with a Comparative Example not according to the present invention.

In contrast, as a comparative example FIG. 3 shows an isothermal DSC cure conversion graph for the DOPO-based mixed resin system disclosed in the Applicant's earlier WO-A-2011/015611. The tested formulation is in Table 2 as Comparative Example 1. For that known DOPO-based mixed resin system, as can be seen from FIG. 3, the cure conversion is only <80% after 16 hours at 95° C. The known DOPO-based resin system had a minimum cure temperature of 95° C., and a cure dwell time at that minimum cure temperature of 16 hours. Alternatively, when the resin system of Comparative Example 1 was subjected to a faster cure at a higher temperature of 140° C., the cure dwell time at the faster cure temperature was 120 minutes.

In other words, the resin system of Example 1 provided a lower temperature and more complete cure that the known DOPO-based mixed resin system of Comparative Example 1.

Table 2 shows that the resin formulation of Comparative Example 1 exhibited unacceptably high MAHRE, 85 kWm$^2$, and smoke density DSmax, 756, for an epoxide resin.

Comparative Example 2

Referring to Table 2, Comparative Example 2 was an epoxide resin system that, as compared to Examples 1 and 2, included a resin system blend of epoxide resins that were unable to accommodate a large filler content system because the epoxide resins comprised a blend of only a semi-solid bisphenol-A epoxy resin and a solid bisphenol-A epoxy resin. The melamine, aluminium polyphosphate and zinc borate fillers as fire retardant additives were each present in a lower concentration than for the corresponding first, second and third fire retardant additives in Examples 1 and 2, because the higher resin viscosity in Comparative Example 2 limited the effective concentrations of these fillers that could be practically incorporated into the epoxide resin system. Table 2 shows that the resin formulation of Comparative Example 2 exhibited unacceptably high MAHRE, 55 kWm$^2$, and smoke density DSmax, 512, for an epoxide resin.

Comparative Example 3

In contrast to Example 3, the same panels were made using the same glass fabric and number of plies but instead of the epoxide resin of Example 3 a typical phenolic resin having FST properties was employed. The mechanical properties of the cured phenolic resin panels were tested. An 8 ply 7781 glass fabric monolithic panel was made and the Interlaminar Shear Strength (ILSS) was tested; the value was 34 MPa. The same panel was tested for flexural strength and flexural modulus; the value of flexural strength was 542 MPa and the value of flexural modulus was 24 GPa. Furthermore, a sandwich panel having a two ply skin with the same glass fabric was made and the Climbing Drum Peel Strength was tested; the value was 100 N/75 mm.

A comparison of the tested FST and mechanical properties for Example 3 and Comparative Example 3 showed that the epoxide resin of the present invention, when used to form prepregs that are subsequently used to form fibre-reinforced cured epoxy resin matrix composite materials, for example in the form of panels, can exhibit improved mechanical properties, in conjunction with good FST properties, and an overall improved performance as compared to phenolic resin panels. In particular, the improved mechanical properties as compared to the phenolic resin panel can enable a reduced weight epoxy resin panel to replace a phenolic resin panel with equivalent mechanical performance. Furthermore, the epoxide resin of the present invention also provides, as compared to phenolic resins, lower toxicity, since the epoxy resin is free of phenol and formaldehyde, improved surface finish and improved processing since the epoxy resin does not release water and/or volatile materials when curing.

TABLE 1

| Formulation-wt % | Example 1 SPX22703 | Example 2 SPX25225 | Example 3 SPX25211 |
|---|---|---|---|
| Semi-solid epoxy novolac resin | 9.7 | 9.7 | 9.7 |
| Solid bisphenol-A epoxy resin | 24.3 | 20.7 | 20.7 |
| Solid epoxy novolac resin | 9.6 | 9.6 | 9.6 |
| Liquid bisphenol-A epoxy resin | 14.5 | 18.1 | 18.1 |
| Liquid bisphenol-F epoxy resin | 0 | 0 | 0 |
| Hydrophobic fumed silica | 1.0 | 1.0 | 1.0 |
| Carbon Monarch | 0 | 0.2 | 0 |
| Titanium dioxide | 0 | 0 | 0.5 |
| Melamine | 4.7 | 4.7 | 4.6 |
| Ammonium polyphosphate | 29.1 | 29.0 | 28.9 |
| Zinc borate | 7.1 | 0 | 0 |
| Microperl ™ glass beads | 0 | 7.0 | 6.9 |
| Properties | | | |
| Resin functionality | 3.3 | 3.3 | 3.3 |
| Viscosity of base resin, i.e. epoxy resin and filler components A and C, at 85° C.-Pa · s | 258 +/− 26 | 316 +/− 32 | 192 +/− 30 |
| Liquid to solid resin ratio-by weight | 0.6 | 0.9 | 0.6 |
| Melamine/APP/ZB or glass bead weight ratio | 1/6.2/1.5 | 1/6.2/1.5 | 1/6.3/1.5 |
| Resin/fillers in base resin-by weight | 58.1/41.9 | 58.1/41.9 | 58.1/41.9 |
| Weight ratio of liquid (resin and catalyst)/solid fillers | 1.65 | 1.70 | 1.65 |
| Phosphorus content-wt % | 9.2 | 9.1 | 9.1 |
| Nitrogen content-wt % | 7.4 | 7.4 | 7.3 |
| MAHRE (kW/m$^2$) | 37 | 36 | 58 |
| Smoke density (Ds max) | 202 | 163 | 67 |

TABLE 2

| Formulation-wt % | Comparative Example 1 | Comparative Example 2 |
|---|---|---|
| Semi-solid bisphenol-A epoxy resin | 44.6 | 43.3 |
| Solid bisphenol-A epoxy resin | 8.9 | 8.6 |
| Hydrophobic fumed Silica | 1.0 | 1.0 |
| Aluminium trihydrate filler | 15.6 | 0 |
| Red phosphorous | 21.9 | 21.3 |
| Melamine | 0 | 2.9 |
| Ammonium polyphosphate | 4.0 | 17.6 |
| Zinc borate | 4.0 | 5.3 |
| Properties | | |
| Melamine/APP/ZB weight ratio | 0/1/1 | 1/6.1/1.8 |
| Resin/fillers in base resin-by weight | 53.5/46.5 | 51.9/48.1 |
| Phosphorus content-wt % | 1.3 | 5.5 |
| Nitrogen content-wt % | 0.6 | 4.5 |
| MAHRE (kW/m$^2$) | 85 | 55 |
| Smoke density (Ds max) | 756 | 512 |

The invention claimed is:

1. An epoxide resin for the manufacture of a fibre-reinforced composite material having fire retardant properties and/or for use as an adhesive or hot-melt adhesive having fire retardant properties, the epoxide resin being halogen-free and phenolic resin-free, the epoxide resin comprising:
   A. a mixture of (i) at least one first non-halogenated multifunctional epoxide-containing resin which has an epoxide functionality of greater than 2 and which is solid at 20° C., and (ii) at least one second non-halogenated multifunctional epoxide-containing resin which has an epoxide functionality of less than or equal to 2 and which is liquid at 20° C.;
   B. at least one catalyst for curing the mixture of epoxide-containing resins to form a cured epoxy resin; and
   C. a mixture of first, second and third fire retardant additives for reacting together to form an intumescent char when the cured epoxy resin is exposed to a fire, wherein (i) the first fire retardant additive comprises a blowing agent for generating a non-combustible gas, (ii) the second fire retardant additive comprises an acid donor for decomposing to form a phosphoric acid when the cured epoxy resin is exposed to a fire, wherein the second fire retardant additive comprises or consists of ammonium polyphosphate and the ammonium polyphosphate of the second fire retardant additive is present in a concentration of from 27 to 32.5 wt % based on the weight of the epoxide resin, and (iii) the third fire retardant additive comprises at least one or both of (a) a ceramic or glass material and (b) a ceramic or glass material precursor for to form a ceramic or glass material when the cured epoxy resin is exposed to a fire, wherein in the mixture of first, second and third fire retardant additives, the first, second and third fire retardant additives are present in a weight ratio of 1:6-6.5:1.3-1.7.

2. An epoxide resin according to claim 1 wherein the first fire retardant additive comprises or consists of melamine.

3. An epoxide resin according to claim 1 wherein the first fire retardant additive is present in a concentration of from 4.6 to 4.7 wt %, based on the weight of the epoxide resin.

4. An epoxide resin according to claim 1 wherein the ammonium polyphosphate of the second fire retardant additive is present in a concentration of from 28.5 to 32 wt %, based on the weight of the epoxide resin.

5. An epoxide resin according to claim 1 wherein the third fire retardant additive comprises or consists of at least one of, or a mixture of any two or more of, the following: (i) a salt of a divalent metal cation and an oxoanion; (ii) a salt of a trivalent metal and an oxoanion; (iii) a glass material in particulate form; or (iv) a clay or ceramic material in particulate form.

6. An epoxide resin according to claim 5 wherein the third fire retardant additive comprises or consists of a salt of a zinc or calcium cation and an oxoanion selected from borate, molybdate, phosphate, phosphite, hypophosphite and hydroxyl stannate, the third fire retardant additive comprises or consists of a salt of aluminium and an oxoanion selected from borate, molybdate, phosphate, phosphite, hypophosphite and hydroxyl stannate, or the third fire retardant additive comprises or consists of an aluminosilicate clay in particulate form.

7. An epoxide resin according to claim 1 wherein the third fire retardant additive is present in a concentration of from 6 to 8 wt %, or from 6.75 to 7.5 wt %, based on the weight of the epoxide resin.

8. An epoxide resin according to claim 1 wherein in the mixture of first, second and third fire retardant additives, the first, second and third fire retardant additives are present in a weight ratio of 1:6.1-6.4:1.5-1.6.

9. An epoxide resin according to claim 1 wherein in the mixture of first, second and third fire retardant additives, the second and third fire retardant additives are present in a weight ratio of greater than 4:1 to up to 4.5:1.

10. An epoxide resin according to claim 1 wherein component A, the mixture of epoxide-containing resins, and component C, the mixture of first, second and third fire retardant additives, are present in a weight ratio of 52-68:32-48, or a weight ratio of 56-62:38-44.

11. An epoxide resin according to claim 1 wherein component C, the mixture of first, second and third fire retardant additives, provides the epoxide resin with a phosphorus content of from 7 to 10.5 wt %, or from 8 to 9.25 wt %, based on based on the weight of the epoxide resin.

12. An epoxide resin according to claim 1 wherein component C, the mixture of first, second and third fire retardant additives, provides the epoxide resin with a nitrogen content of from 5.8 to 8.25 wt %, or from 7 to 7.5 wt %, based on based on the weight of the epoxide resin.

13. An epoxide resin according to claim 1 wherein component A in the epoxide-resin has a viscosity of from 1.5 to 15 Pa·s measured at a temperature of 85° C., measured using a viscometer sold under the trade name Brookfield CAP2000HT viscometer, with a cone number 3, a rotational velocity of 50 rpm, and for a period of 20 seconds, or from 2 to 10 Pa·s, from 7 to 10 Pa·s or from 2 to 7 Pa·s measured under those conditions.

14. An epoxide resin according to claim 1 wherein in component A, the mixture comprises from 20 to 40 wt % of the at least one first non-halogenated multifunctional epoxide-containing resin, and from 10 to 30 wt % of the at least one second non-halogenated multifunctional epoxide-containing resin, each wt % being based on the weight of the epoxide resin; and wherein in component A, the mixture optionally further comprises from 5 to 15 wt %, based on the weight of the epoxide resin, of at least one third epoxide-containing resin which is semi-solid at 20° C.

15. An epoxide resin according to claim 1 wherein in component A, the at least one first non-halogenated multifunctional epoxide-containing resin is present in a concentration of from 8 to 12 wt %, or from 9 to 11 wt %, based on the weight of the epoxide resin.

16. An epoxide resin according to claim 1 wherein in component A, the at least one first non-halogenated multifunctional epoxide-containing resin comprises or consists of a solid bisphenol-A epoxy novolac resin.

17. An epoxide resin according to claim 1 wherein in component A, the at least one second non-halogenated multifunctional epoxide-containing resin is present in a concentration of from 45 to 52 wt %, or from 47 to 50 wt %, based on the weight of the epoxide resin.

18. An epoxide resin according to claim 1 wherein in component A, the at least one second non-halogenated multifunctional epoxide-containing resin comprises or consists of a liquid bisphenol-A epoxy resin, the at least one first non-halogenated multifunctional epoxide-containing resin optionally comprises an epoxy novolac resin, and the mixture further comprises a solid bisphenol-A epoxy resin.

19. An epoxide resin according to claim 18 wherein in component A, the solid bisphenol-A epoxy resin is present in a concentration of from 22 to 26 wt %, the liquid bisphenol-A epoxy resin is present in a concentration of from 12 to 17 wt %, and when present the epoxy novolac resin is present in a concentration of from 8 to 12 wt %, each based on the weight of the epoxide resin.

20. An epoxide resin according to claim 19 wherein in component A, the solid bisphenol-A epoxy resin is present in a concentration of from 23 to 25 wt %, the liquid bisphenol-A epoxy resin is present in a concentration of from 13 to 15 wt %, and when present the epoxy novolac resin is present in a concentration of from 9 to 11 wt %, each based on the weight of the epoxide resin.

21. An epoxide resin according to claim 1 which is free of any elastomeric material or elastomeric toughening additive.

22. An epoxide resin according to claim 1 wherein the at least one catalyst comprises plural catalysts, each having a respective curing temperature range, and the plural temperature ranges overlap to provide a cumulative curing temperature range for the epoxide-containing resin.

23. An epoxide resin according to claim 1 wherein the at least one catalyst for curing the epoxide-containing resin comprises or consists of a dicyanamide-based catalyst.

24. An epoxide resin according to claim 1 which is free of any epoxide-containing molecule that has been chemically reacted with a phosphinic acid derivative or dihydro-oxaphospha-phenanthrene-oxide (DOPO).

25. An epoxide resin according to claim 1 further comprising at least one accelerator for the at least one catalyst, wherein the accelerator comprises an imidazole-based accelerator and/or a urea-based accelerator.

26. An epoxide resin according to claim 1 further comprising at least one anti-settling agent, wherein the at least one anti-settling agent comprises silicon dioxide, or amorphous silicon dioxide, or hydrophobic fumed silica, and wherein the at least one anti-settling agent is present in an amount of from 0.5 to 1.5 wt % based on the weight of the epoxide resin.

27. A prepreg comprising the epoxide resin of claim 1 and a fibrous reinforcement, wherein the epoxide resin forms an epoxide resin matrix which at least partially impregnates the fibrous reinforcement.

28. A fibre-reinforced composite material produced from the prepreg of claim 27.

\* \* \* \* \*